United States Patent
Yu et al.

(10) Patent No.: US 9,420,449 B2
(45) Date of Patent: Aug. 16, 2016

(54) METHOD, APPARATUS, AND SYSTEM FOR ONLINE SUBSCRIPTION DATA CONFIGURATION

(71) Applicant: Huawei Technologies Co., Ltd., Shenzhen (CN)

(72) Inventors: Youyang Yu, Shenzhen (CN); Yijun Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/572,497

(22) Filed: Dec. 16, 2014

(65) Prior Publication Data

US 2015/0105075 A1  Apr. 16, 2015

Related U.S. Application Data

(63) Continuation of application No. PCT/CN2012/077892, filed on Jun. 29, 2012.

(51) Int. Cl.
  *H04W 8/18*  (2009.01)
  *H04W 4/00*  (2009.01)
  *H04W 8/24*  (2009.01)

(52) U.S. Cl.
  CPC ............. *H04W 8/183* (2013.01); *H04W 4/005* (2013.01); *H04W 8/18* (2013.01); *H04W 8/24* (2013.01)

(58) Field of Classification Search
  CPC ............................. H04W 8/183; H04W 4/005
  See application file for complete search history.

(56) References Cited

U.S. PATENT DOCUMENTS

| | | | | |
|---|---|---|---|---|
| 6,603,969 | B1 * | 8/2003 | Vuoristo | H04W 8/18 455/433 |
| 2008/0162637 | A1 * | 7/2008 | Adamczyk | H04L 12/5815 709/204 |
| 2011/0280155 | A1 | 11/2011 | Shi | |
| 2012/0030331 | A1 * | 2/2012 | Karampatsis | H04L 41/0893 709/223 |
| 2012/0079082 | A1 * | 3/2012 | Ding | H04W 8/20 709/220 |
| 2012/0163297 | A1 * | 6/2012 | Agarwal | H04L 12/1425 370/328 |

(Continued)

FOREIGN PATENT DOCUMENTS

| | | |
|---|---|---|
| CN | 101772153 A | 7/2010 |
| CN | 101790150 A | 7/2010 |
| CN | 101860807 A | 10/2010 |

(Continued)

*Primary Examiner* — Mazda Sabouri
(74) *Attorney, Agent, or Firm* — Leydig, Voit & Mayer, Ltd.

(57) ABSTRACT

The present invention provides a method, an apparatus, and a method for online subscription data configuration. This method for online subscription data configuration includes: acquiring, by a subscription data configuration function device (SMF), equipment capability information of a user equipment (UE) and information of a service supported by the UE; generating, by the SMF, user subscription data according to the equipment capability information of the UE and the information of service supported by the UE, and generating user service subscription data according to the information of the service supported by the UE; where the user subscription data and the user service subscription data include an international mobile subscriber identity (IMSI) allocated to the UE by the SMF; performing, by the SMF, subscription data configuration on a home subscriber server (HSS) and a subscription profile repository (SPR), according to the user subscription data and the user service subscription data.

7 Claims, 10 Drawing Sheets

(56) References Cited

U.S. PATENT DOCUMENTS

2012/0307844 A1* 12/2012 Bollapalli ............... H04L 67/16
 370/503
2013/0273876 A1* 10/2013 Rasanen ........... H04M 3/42153
 455/404.1

FOREIGN PATENT DOCUMENTS

| CN | 101990280 A | 3/2011 |
| CN | 102076124 A | 5/2011 |
| CN | 102421086 A | 4/2012 |

* cited by examiner

METHOD, APPARATUS, AND SYSTEM FOR ONLINE SUBSCRIPTION DATA CONFIGURATION

CROSS-REFERENCE TO RELATED APPLICATIONS

This application is a continuation of International Patent Application No. PCT/CN2012/077892, filed on Jun. 29, 2012, which is hereby incorporated by reference in its entirety.

TECHNICAL FIELD

Embodiments of the present invention relate to communication technologies and, in particular, to a method, an apparatus, and a system for online subscription data configuration.

BACKGROUND

As a basic requirement of mobile communication, before entering a mobile network to perform mobile communication, a user equipment (UE) must first go to an operator for opening an account, so as to obtain a legal and valid SIM (subscriber identity module) card/UICC (universal integrated circuit card), and then carry out the mobile communication services, such as voice calls and mobile surfing; this basic requirement is applicable to traditional 2G/3G circuit service such as voice, and is applicable to 2G/3G data service such as GPRS (general packet radio service) surfing, and is also applicable to the voice and data service in 4G LTE (long term evolution) network.

In the prior art, for the UE using a subscriber identity module (SIM) card, by inserting the SIM into the UE, it can achieve subscription data configuration of the UE with respect to the network operator selling the SIM card, and by changing the SIM card, the network operator can be changed.

However, for a UE in a machine to machine (M2M) system, because of utilizing an embedded universal circuit card (eUICC), once manufacturing of a device is finished, it is very difficult to change the eUICC embedded in the device, thus the configuration or update of the subscription data should be completed online, therefore, the network side also needs to complete the online subscription data configuration procedure synchronously. In the prior art, the network side doesn't support the online subscription data configuration and, thus, in the M2M system, the requirements of the user or the application provider for changing the network operator cannot be satisfied.

SUMMARY

Embodiments of the present invention provide a method for online subscription data configuration, which are used to solve the problem in the prior art that a UE using an eUICC switches among different operator network.

In one aspect, embodiments of the present invention provide a method for online subscription data configuration, including:

acquiring, by an SMF (Subscription Management Function, subscription data configuration function device), equipment capability information of a user equipment (UE) and information of a service supported by the UE;

generating, by the SMF, user subscription data according to the equipment capability information of the UE and the information of the service supported by the UE, and generating user service subscription data according to the information of the service supported by the UE; where the user subscription data and the user service subscription data include an IMSI (International Mobile Subscriber Identification Number, international mobile subscriber identity) allocated to the UE by the SMF; and performing, by the SMF, subscription data configuration on an HSS (home subscriber server) and an SPR (subscription profile repository), according to the user subscription data and the user service subscription data.

In another aspect, embodiments of the present invention further provide a method for online subscription data configuration, including:

transmitting, by an HSS, a first subscription information configuration request to an SMF, where the first subscription information configuration request includes an IMEI (international mobile equipment identity) of a UE; and receiving and storing, by the HSS, user subscription data transmitted by the SMF, where the user subscription data is generated according to equipment capability information of the UE and information of a service supported by the UE and is transmitted by the SMF, and the user subscription data includes the international mobile subscriber identity (IMSI) allocated to the UE by the SMF.

In still another aspect, embodiments of the present invention further provide a method for online subscription data configuration, including:

transmitting, by an MME (Mobility Management Entity, mobility management network element), a first subscription information configuration request to an SMF, where the first subscription information configuration request includes an IMEI of a UE; and receiving, by the MME, a first subscription information configuration response message transmitted by the SMF, where the first subscription information configuration response message is transmitted by the SMF after the SMF acquires equipment capability information of the UE and information of a service supported by the UE, generates user subscription data according to the equipment capability information of the UE and the information of the service supported by the UE, generates user service subscription data according to the information of the service supported by the UE, and completes subscription data configuration on a home subscriber server (HSS) and a subscription profile repository (SPR) according to the user subscription data and the user service subscription data.

In still another aspect, embodiments of the present invention further provide a method for online subscription data configuration, including:

acquiring, by an application server (AF), equipment capability information of a user equipment (UE), and information of a service supported by the UE; and transmitting, by the AF, the equipment capability information of the UE and the information of the service supported by the UE to a subscription data configuration function device (SMF), to enable the SMF to generate user subscription data according to the equipment capability information of the UE and the information of the service supported by the UE, and generate user service subscription data according to the information of the service supported by the UE, and perform subscription data configuration on a home subscriber server (HSS) and a subscription profile repository (SPR) according to the user subscription data and the user service subscription data, where the user subscription data and the user service subscription data include an international mobile subscriber identity (IMSI) allocated to the UE by the SMF.

According to the methods, the apparatuses and the system for online subscription data configuration provided in embodiments of the present invention, performing online subscription data configuration on the network side can be realized, when a UE first connects to a network of a second operator, or switches from a network of a first operator to a network of a second operator, thereby satisfying the requirements of a user or an application provider utilizing an eUICC for changing an operator.

DESCRIPTION OF EMBODIMENTS

A method for online subscription data configuration of the present invention can be applicable to a network system as M2M, in which a UE utilizes an eUICC, when the UE is configured with no subscription data of any operator and connects to a network of a second operator for the first time, or when the UE has already been configured with subscription data of a first operator, but the UE or a service provider needs to initiate a connection to the network of the second operator, reconfiguration of subscription data of the second operator can be performed according to the method for online subscription data configuration provided by the present invention.

In embodiments of the present invention, when a UE has been configured with subscription data, a first operator refers to the operator to which the subscription data currently configured for the UE belongs, and a second operator refers to the operator to which subscription data required to be configured for the UE belongs; when a UE has been configured with no subscription data, a second operator refers to the operator to which subscription data required to be configured for the UE belongs.

In embodiments of the present invention, performing online subscription data configuration on a HSS and a SPR by a SMF is realized. In embodiments of the present invention, network elements involved in the online subscription data configuration procedure are not limited to be within the same operator network. For example, in the case that the UE has been configured with the subscription data of the first operator, a network connected to the first operator may perform subscription data configuration on a network side device of a network of a second operator; and in the case that the UE has been configured with the subscription data of the first operator, a network connected to the second operator may also perform subscription data configuration on the network side device of the network of the second operator; and in the case that the UE has been configured with no subscription data, the network connected to the second operator may also perform subscription data configuration on the network side device of the network of the second operator.

Figure 1:
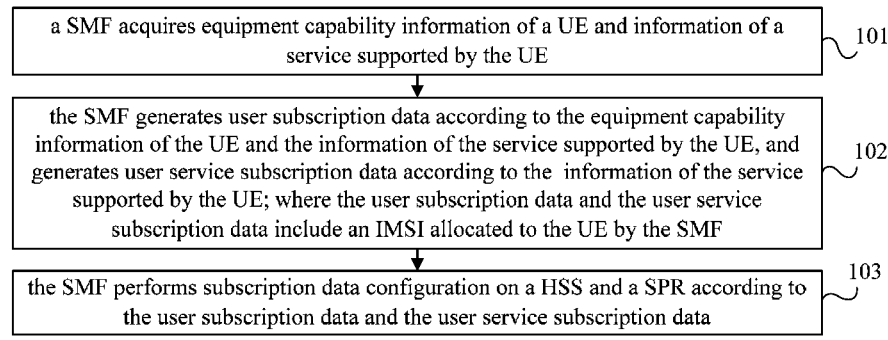
FIG. 1 is a schematic flowchart of a method for online subscription data configuration according to an embodiment of the present invention.

FIG. 1 is a schematic flowchart of a method for online subscription data configuration according to an embodiment of the present invention; as shown in FIG. 1, the method for online subscription data configuration provided in this embodiment includes:

Step 101: a SMF acquires equipment capability information of a UE and information of a service supported by the UE;

Step 102: the SMF generates user subscription data according to the equipment capability information of the UE and the information of the service supported by the UE, and generates user service subscription data according to the information of the service supported by the UE; where the user subscription data and the user service subscription data include an IMSI allocated to the UE by the SMF; and Step 103: the SMF performs subscription data configuration on a HSS and a SPR according to the user subscription data and the user service subscription data.

By the steps from step 101 to step 103, performing online subscription data configuration on the network side can be realized, when the UE is configured with no subscription data of any operator, or the UE is already configured with subscription data of a first operator but needs to be reconfigured with subscription data of a second operator, thereby satisfying the requirements of a user utilizing an eUICC for changing an operator.

The executive entity of this embodiment is a SMF.

Where, the equipment capability information of the UE may include: a connection form supported by the UE, namely a circuit connection and/or a data connection supported by the UE, and an encryption security algorithm supported by the UE; the information of the service supported by the UE may include: a service identifier (used for identifying a service type supported by the UE) and access point (APN) information; the user subscription data may include: the IMSI of the UE, the connection forms supported by the UE, an authorization and authentication vector, an accounting-related parameter and regional roaming restriction; and the user service subscription data may include: the IMSI of the UE, a UE bearer quality of service (QoS) parameter, and an accounting policy.

The performing, by the SMF, the subscription data configuration on the HSS and the SPR according to the user subscription data and the user service subscription data may include:

The SMF transmits the user subscription data to the HSS, to enable the HSS to store the user subscription data; and The SMF transmits the user service subscription data to the SPR, to enable the SPR to store the user service subscription data.

Optionally, after transmitting the user subscription data to the HSS, the SMF may also receive a storing user subscription data success indication message replied by the HSS, and confirms that the HSS has already stored the user subscription data successfully according to the indication message.

Optionally, after transmitting the user service subscription data to the SPR, the SMF may also receive a storing user service subscription data success indication message replied by the SPR, and confirms that the SPR has already stored the user service subscription data successfully according to the indication message.

An embodiment of acquiring, by the subscription data configuration function device (SMF), the equipment capability information of the user equipment (UE) and the information of the service supported by the UE may include:

The SMF acquires a first subscription information configuration request, where the first subscription information configuration request includes the IMEI of the UE;

The SMF transmits an authorization and authentication request to the AF, where the authorization and authentication request includes the IMEI of the UE; and The SMF receives an authorization and authentication response message returned by the AF, where the authorization and authentication response message includes the equipment capability information of the UE and the information of the service supported by the UE.

An embodiment of acquiring, by the SMF, the first subscription information configuration request may include:

The SMF receives the first subscription information configuration request transmitted by the UE; or The SMF receives the first subscription information configuration request transmitted by the HSS, where the first subscription information configuration request is forwarded by the HSS after being transmitted from the UE to the HSS via an MME; or The SMF receives the first subscription information configuration request transmitted by an MME, where the first subscription information configuration request is forwarded by the MME after being sent by the UE to the MME.

Another embodiment of acquiring, by the subscription data configuration function device (SMF), the equipment capability information of the user equipment (UE) and the information of the service supported by the UE may include:

The SMF receives a second subscription information configuration request, where the second subscription information configuration request includes: the equipment capability information of the UE, the information of the service supported by the UE and the IMEI of the UE.

The method provided in the above embodiments may also include: the SMF generates first subscription data needed by the UE according to the equipment capability information of the UE, and transmits the first subscription data to the UE, to enable the UE to store the first subscription data. By transmitting the first subscription data to the UE, the online subscription data configuration can be performed on the UE, thereby satisfying the requirements of a user or an application provider utilizing an eUICC for changing an operator.

The transmitting, by the SMF, the first subscription data to the UE may include:

The SMF transmits a first subscription information configuration response message to the HSS, to enable the HSS to forward the first subscription data to the UE via a mobility management entity (MME), where the first subscription information configuration response message includes the first subscription data; or The SMF transmits the first subscription information configuration response message to a mobility management entity (MME), to enable the MME to transmit the first subscription data to the UE; or The SMF transmits a second subscription information configuration response message to the AF, so as to transmit the subscription data to the UE via the AF, where the second subscription information configuration response message includes the first subscription data.

Figure 2:
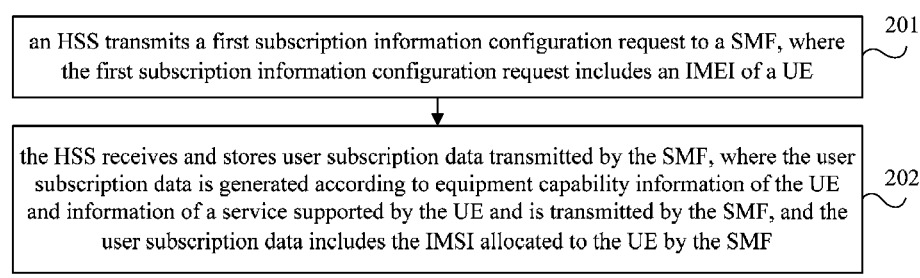
FIG. 2 is a schematic flowchart of a method for online subscription data configuration according to another embodiment of the present invention.

FIG. 2 is a schematic flowchart of a method for online subscription data configuration according to another embodiment of the present invention; as shown in FIG. 2, the method for online subscription data configuration provided in this embodiment, includes:

Step 201: an HSS transmits a first subscription information configuration request to a SMF, where the first subscription information configuration request includes an IMEI of a UE; and Step 202: the HSS receives and stores user subscription data transmitted by the SMF, where the user subscription data is generated according to equipment capability information of the UE and information of a service supported by the UE and is transmitted by the SMF, and the user subscription data includes the IMSI allocated to the UE by the SMF.

The executive entity of this embodiment is an HSS.

By the step 201 and the step 202, performing subscription data configuration on the network side online can be realized, thereby the requirements for initial connection or changing the operator can be realized for the network system in which a UE utilizes an eUICC.

After receives the first subscription information configuration request, the SMF shall acquires the IMEI of the UE from the first subscription information configuration request, and then encapsulates the IMEI of the UE in an authorization and authentication request and transmits to the AF, to enable the AF to perform authentication on the UE, and returns the equipment capability information of the UE and the information of the service supported by the UE through an authorization and authentication response message after the authentication is passed. Afterwards, the SMF generates the user subscription data according to the equipment capability information of the UE and the information of the service supported by the UE.

Further, before the HSS transmits the first subscription information configuration request to the SMF, the method may include: the HSS receives the first subscription information configuration request which is forwarded via an MME from the UE.

The HSS may also receive first subscription data needed by the UE, where the first subscription data is transmitted by the SMF, and transmit a first subscription information configuration response message to the UE, where the first subscription information configuration response message includes the first subscription data, and the first subscription data is generated by the SMF according to the equipment capability information of the UE. By transmitting the first subscription data to the UE, performing subscription data configuration on the UE online can be realized, thereby the requirements for initial connection or changing the operator can be realized for the network system in which a UE utilizes an eUICC.

Figure 3:
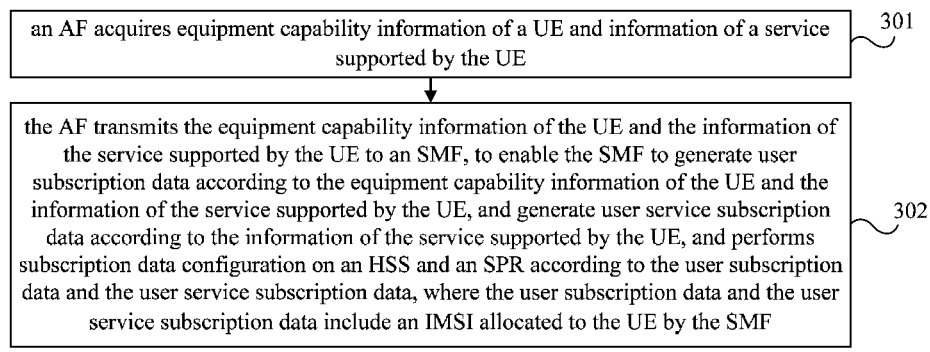
FIG. 3 is a schematic flowchart of a method for online subscription data configuration according to still another embodiment of the present invention.

FIG. 3 is a schematic flowchart of a method for online subscription data configuration according to another embodiment of the present invention. As shown in FIG. 3, the method for online subscription data configuration provided in this embodiment, includes:

Step 301: an AF acquires equipment capability information of a UE and information of a service supported by the UE; and Step 302: the AF transmits the equipment capability information of the UE and the information of the service supported by the UE to an SMF, to enable the SMF to generate user subscription data according to the equipment capability information of the UE and the information of the service supported by the UE, and generate user service subscription data according to the information of the service supported by the UE, and performs subscription data configuration on an HSS and an SPR according to the user subscription data and the user service subscription data, where the user subscription data and the user service subscription data include an IMSI allocated to the UE by the SMF.

By the step 301 and the step 302, for the network system in which a UE utilizes an eUICC, when a UE needs to connect to an operator network for the first time or change an operator network, performing subscription data configuration on the network side online can be realized.

The executive entity of this embodiment is an AF.

After receiving the equipment capability information of the UE and the information of the service supported by the UE, the SMF generates the user subscription data according to the equipment capability information of the UE and the information of the service supported by the UE; generates the user service subscription data according to the information of the service supported by the UE; and then transmits the user subscription data and the user service subscription data to the HSS and the SPR respectively, so as to realized the subscription data configuration for the HSS and the SPR.

The acquiring, by the AF, the equipment capability information of the UE and the information of the service supported by the UE, may includes:

The AF receives an authorization and authentication request transmitted by the UE, where the authorization and authentication request includes the IMEI of the UE;

The AF acquires the equipment capability information of the UE and the information of the service supported by the UE according to the IMEI of the UE in the authorization and authentication request; and The transmitting, by the AF, the equipment capability information of the UE and the information of the service supported by the UE to the SMF may include:

The AF transmits an authorization and authentication response message to the SMF, where the authorization and authentication response message includes the equipment capability information of the UE and the information of the service supported by the UE.

The acquiring, by the AF, the equipment capability information of the UE and the information of the service supported by the UE may includes:

The AF receives an operator switching instruction; and

The AF acquires the equipment capability information of the UE and the information of the service supported by the UE according to the operator switching instruction.

For example, when a UE decides to switch an operator network, the UE may transmit the operator switching instruction to the AF; or, when a service provider decides to switch its services from a network of a first operator to a network of a second operator, the operator switching instruction may be input to the AF by an administrator of the service provider, to enable the AF to extract the equipment capability information of the UE and the information of the service supported by the UE from the operator switching instruction.

The transmitting, by the AF, the equipment capability information of the UE and the information of the service supported by the UE to the SMF may include:

The AF transmits a second subscription information configuration request to the SMF, where the second subscription information configuration request includes: the equipment capability information of the UE, the information of the service supported by the UE, and the IMEI of the UE.

Optionally, after the AF transmits the second subscription information configuration request to the SMF, the method further includes:

The AF receives a second subscription information configuration response message transmitted by the SMF, where the second subscription information configuration response message includes first subscription data needed by the UE; where the first subscription data is generated by the SMF according to the equipment capability information of the UE; and The AF transmits the first subscription data to the UE.

By transmits the first subscription data to the UE, for the network system in which a UE utilizes an eUICC, when the UE needs to connect to an operator network for the first time or change an operator network, the subscription data configuration may be online performed on the network side.

Figure 4A:
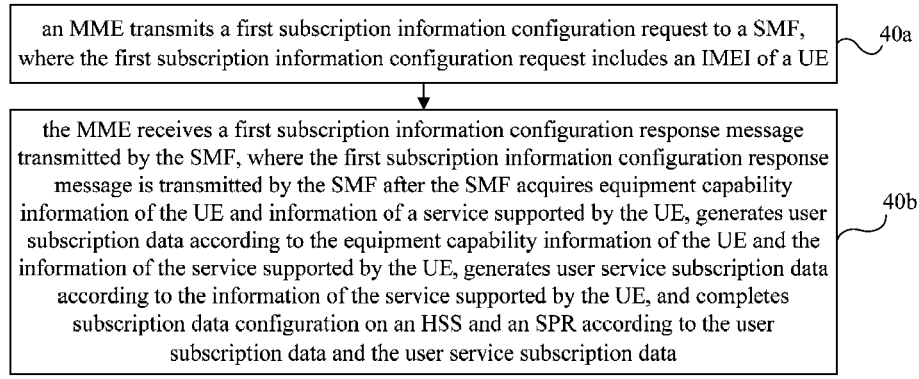
FIG. 4A is a schematic flowchart of a method for online subscription data configuration according to still another embodiment of the present invention.

FIG. 4A is a schematic flowchart of a method for online subscription data configuration according to another embodiment of the present invention. As shown in FIG. 4A, the method for online subscription data configuration provided in this embodiment includes:

Step 40a: an MME transmits a first subscription information configuration request to a SMF, where the first subscription information configuration request includes an IMEI of a UE; and For example, when detecting that the UE is not configured with any subscription data, or detecting that the UE is already configured with subscription data of a first operator and receiving an indication that the UE needs to be configured with subscription data online once again from the UE, the MME may transmit the first subscription information configuration request to the SMF.

Step 40b: the MME receives a first subscription information configuration response message transmitted by the SMF, where the first subscription information configuration response message is transmitted by the SMF after the SMF acquires equipment capability information of the UE and information of a service supported by the UE, generates user subscription data according to the equipment capability information of the UE and the information of the service supported by the UE, generates user service subscription data according to the information of the service supported by the UE, and completes subscription data configuration on an HSS and an SPR according to the user subscription data and the user service subscription data.

The executive entity of this embodiment is MME.

The following describes the technical solutions of the present invention in detail by utilizing several specific embodiments.

Figure 4B:
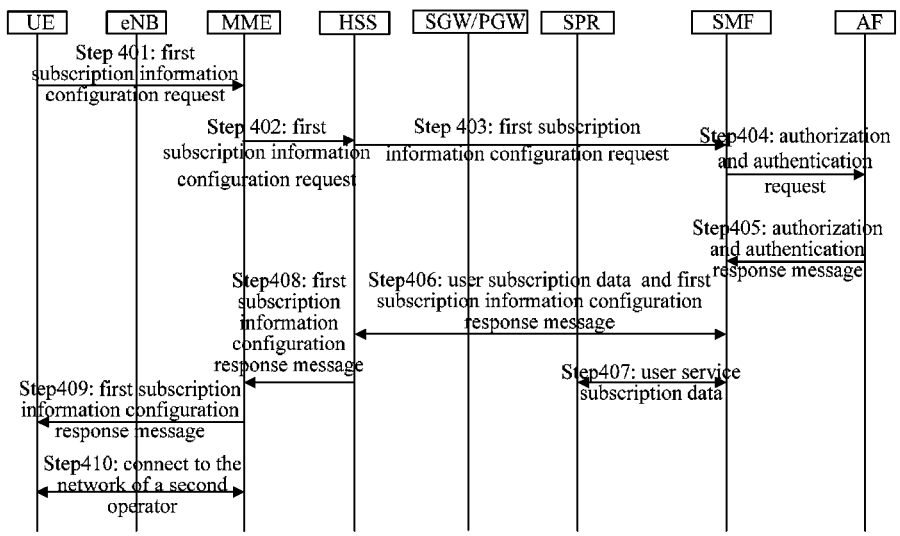
FIG. 4B is a schematic signaling flowchart of online subscription data configuration described from a perspective of interactions among multiple network elements according to an embodiment of the present invention.

FIG. 4B is a schematic signaling flowchart of online subscription data configuration described from a perspective of interactions among multiple network elements according to an embodiment of the present invention; please refer to FIG. 4B, the method provided in this embodiment is applicable to a subscription configuration procedure that a UE is configured with no subscription data of any operator, and the UE connects to a network of a second operator directly; and is certainly applicable to the case that a UE has already connected to the network of the first operator, and needs to change to a network of a second operator; e.g., regarding the case that the UE has already connected to the network of the first operator, and needs to change to the network of the second operator, the UE may be triggered to perform the online subscription data configuration procedure by inputting a PLMN ID (Public Land Mobile Network Identity, public land mobile network identity) of the network of the second operator to the UE, that is, when inputting the PLMN ID of the network of the second operator to the UE is completed, the UE begins executing the steps in this embodiment. The method of this embodiment may include:

Step 401: a UE transmits a first subscription information configuration request; where the first subscription information configuration request may include an IMEI of the UE.

Optionally, besides the IMEI of the UE, the first subscription information configuration request may also include equipment capability information of the UE and PLMN ID of the network of the second operator and etc. If the UE is configured with subscription data of a first operator, then the first subscription information configuration request may also carry an IMSI which is allocated to the UE by the network of the first operator.

Step 402: after receiving the first subscription information configuration request transmitted by the UE, the MME forwards the first subscription information configuration request to a HSS of the second operator. Where, the HSS may be selected according to technical means in the prior art, for example, based on static configuration or according to the user's location and etc, no particular limitation is made to this in the present patent.

Optionally, after receiving the first subscription information configuration request and before forwarding it the MME may also perform authentication and security encryption on the UE according to the IMEI included in the first subscription information configuration request.

Step 403: after receiving the first subscription information configuration request transmitted by the MME, the HSS transmits the first subscription information configuration request to a SMF of the second operator; where, the HSS, the MME and the SMF may all belong to the network of the second operator.

Optionally, before transmitting the first subscription information configuration request to the SMF of the second operator, the HSS may also perform authentication and security encryption on the UE in advance, after that, may also generate temporary subscription data for the UE, where the temporary subscription data at least includes the device identifier (IMEI) of the UE. Certainly, the HSS may also forward the first subscription information configuration request to the SMF directly.

Step 404: the SMF searches out an AF corresponding to the UE according to the IMEI in the first subscription information configuration request, and transmits an authorization and authentication request to the AF, where the authorization and authentication request includes the IMEI of the UE.

Step 405: the AF performs authorization and authentication on the UE according to the IMEI of the UE in the received authorization and authentication request, and acquires equipment capability information of the UE and the information of a service supported by the UE according to the IMEI of the UE, and transmits an authorization and authentication response message to the SMF when the UE passes the authorization and authentication, where the authorization and authentication response message includes the equipment capability information of the UE and the information of the service supported by the UE.

Step 406: the SMF acquires the equipment capability information of the UE and the information of the service supported by the UE from the received authorization and authentication response message, allocates an IMSI of the second operator to the UE, and generates user subscription data according to the equipment capability information of the UE and the information of the service supported by the UE, and generates user service subscription data according to the information of the service supported by the UE, and may further generate first subscription data needed by the UE according to the equipment capability information of the UE; where, the user subscription data and the user service subscription data may include the IMSI allocated to the UE by the SMF.

Where, the equipment capability information of the UE may include: a connection forms supported by the UE, namely a circuit connection and/or a data connection supported by the UE, and an encryption security algorithm supported by the UE, of course, an universal authorization and authentication vector and etc may also be included; and the information of the service supported by the UE may include: service identifier (used for identifying a service type supported by the UE) and APN information.

The user subscription data may include: the IMSI of the UE, the connection forms supported by the UE, an authorization and authentication vector, an accounting-related parameter and regional roaming restriction; and the user service subscription data may include: the IMSI of the UE, a UE bearer QoS parameter, and an accounting policy; while the first subscription data may include: an IMSI of the UE, an authorization and authentication vector and etc.

The SMF transmits the aforementioned user subscription data to the HSS; and transmits a first subscription information configuration response message to the HSS, where the first subscription information configuration response message includes the first subscription data.

Optionally, the SMF may transmit the aforementioned user subscription data and the first subscription data to the HSS simultaneously through one message, e.g., transmitting the user subscription data and the first subscription data to the HSS simultaneously through the first subscription information configuration response message.

Optionally, the SMF may also transmit the user subscription data and the first subscription data to the HSS through different messages, e.g., transmitting the first subscription data to the HSS through the first subscription information configuration response message, and transmitting the user subscription data to the HSS through another message.

Optionally, if the HSS has already generated temporary subscription data for the UE, the user subscription data may replace the temporary subscription data of the UE which has been already generated.

Step 407: the SMF transmits the user service subscription data to the SPR, to enable the SPR to store the user service subscription data.

For example, the SMF may transmit the user service subscription data to the SPR through a service subscription message, however, it is not be limited herein.

Step 408: the HSS stores the received user subscription data, and forwards the received first subscription information configuration response message to the MME.

Step 409: the MME transmits the first subscription information configuration response message to the UE, where the first subscription information configuration response message includes the first subscription data.

Step 410: After completing the first subscription data configuration, the UE transmits a request for connecting to the network of the second operator, where the specific procedure is similar to the prior art, and will not be repeated herein.

According to the method for subscription data configuration provide in this embodiment, when the UE is configured with no subscription data of any operator, and needs to connect to a network of a second operator, or when the UE has already connected to a network of a first operator, but needs to change to a network of a second operator, performing online subscription data configuration on both the UE and the network side can be realized, thereby satisfying requirements of a UE which utilizes an eUICC.

Figure 5:
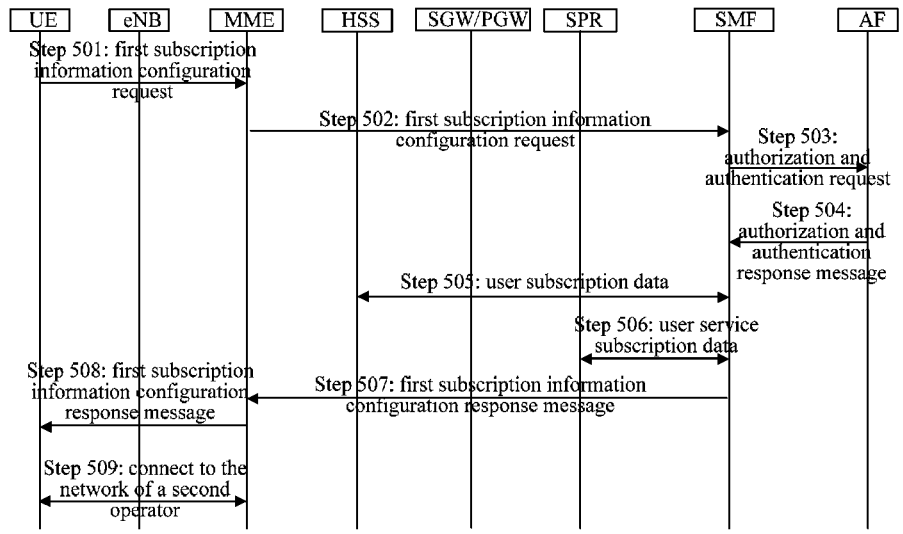
FIG. 5 is a schematic signaling flowchart of online subscription data configuration described from a perspective of interactions among multiple network elements according to another embodiment of the present invention.

FIG. 5 is a schematic signaling flowchart of online subscription data configuration described from a perspective of interactions among multiple network elements according to another embodiment of the present invention; please refer to FIG. 5, the application scenario of this embodiment is similar to that of embodiment 4 except for the difference that a direct communication interface is set between the MME and the SMF in the network side in this embodiment, therefore, the MME can transmit a message to the SMF or receive a message from the SMF directly. The method of this embodiment may include:

Step 501: a UE transmits a first subscription information configuration request; where the first subscription information configuration request may include an IMEI of the UE.

Optionally, besides the IMEI of the UE, the first subscription information configuration request may also include equipment capability information of the UE, a service identifier and a PLMN ID of the network of the second operator and etc. If the UE is already configured with subscription data of a first operator, then the first subscription information configuration request may also carry an IMSI which is allocated to the UE by the network of the first operator.

Step 502: the MME forwards the received first subscription information configuration request to the SMF of the network of the second operator.

Step 503: the SMF searches out an AF corresponding to the UE according to the IMEI in the first subscription information configuration request, and transmits an authorization and authentication request to the AF, where the authorization and authentication request includes the IMEI of the UE.

Step 504: the AF performs authorization and authentication on the UE according to the IMEI of the UE in the received authorization and authentication request, and acquires equipment capability information of the UE and the information of a service supported by the UE according to the IMEI of the UE, and transmits an authorization and authentication response message to the SMF when the UE passes the authorization and authentication, where the authorization and authentication response message includes the equipment capability information of the UE and the information of the service supported by the UE.

Step 505: the SMF allocates an IMSI of the second operator to the UE, and generates user subscription data according to the equipment capability information of the UE and the information of the service supported by the UE, and generates user service subscription data according to the information of the service supported by the UE, and may further generate first subscription data needed by the UE according to the equipment capability information of the UE; and The SMF transmits the user subscription data to the HSS, to enable the HSS to store the user subscription data.

Step 506: the SMF transmits the user service subscription data to the SPR, to enable the SPR to store the user service subscription data.

Step 507: the SMF transmits a first subscription information configuration response message to the MME, where the message includes the first subscription data needed by the UE.

Step 508: the MME forwards the received first subscription information configuration response message to the UE, to enable the UE to store the first subscription data.

Step 509: the UE connects to the network of the second operator, where the specific procedure is similar to the prior art, and will not be repeated herein.

In this embodiment, a direct communication interface is set between the MME and the SMF, which makes the interaction process more simplified, and is help for improving the efficiency of subscription data configuration.

Figure 6:
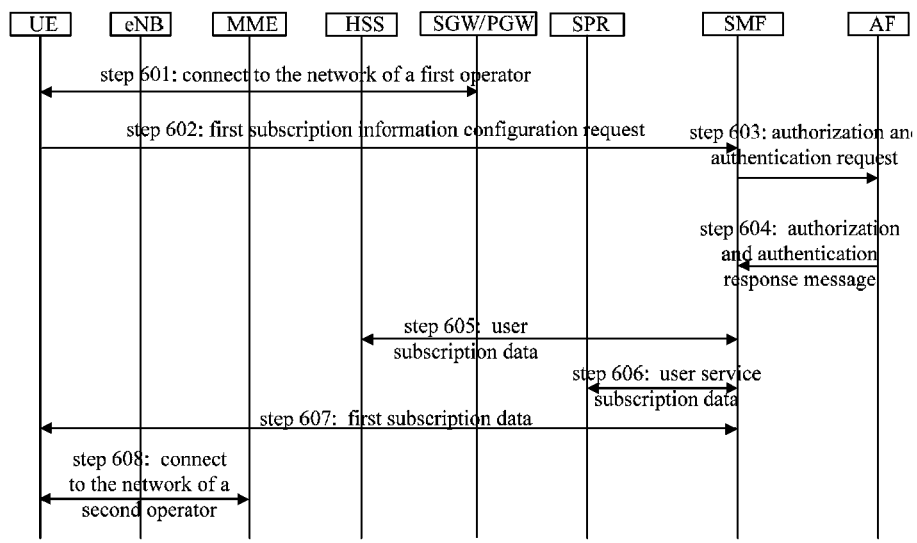
FIG. 6 is a schematic signaling flowchart of online subscription data configuration described from a perspective of interactions among multiple network elements according to still another embodiment of the present invention.

FIG. 6 is a schematic signaling flowchart of online subscription data configuration described from a perspective of interactions among multiple network elements according to still another embodiment of the present invention; please refer to FIG. 6, the method provided in the this embodiment is applicable to the case that a UE has already connected to a network of a first operator, and then the UE initiates switching a service from the network of the first operator to the network of the second operator; or, is also applicable to the case that a service provider decides to switch a certain service (e.g. smart meter service) from the network of the first operator to the network of the second operator, in this case, the service provider can utilize the connection which has already been established between the UE and the network of the first operator to notify the UE of the identifier of the SMF of the second operator, and trigger the UE to initiate the online subscription data configuration procedure. The method in this embodiment may include:

Step 601: a UE connects to a network of a first operator by utilizing subscription data of the first operator. For example, the UE initiates an attach procedure to a network of operator A based on the prior art, where the specific flow may be as following: the UE transmits an attach request message to a MME, where the attach request message includes an IMSI of the UE; the MME initiates a location update procedure to a HSS based on the IMSI of the UE; the HSS makes index of user subscription data based on the IMSI, and completes authorization and authentication procedure between the UE and the network side;

Then, the MME creates user context, and initiates a default bearer establishment procedure based on the user subscription data, where, it also needs to create the user context on the SGW (serving gateway)/PGW (PDN Gateway, serving gateway), and allocate bearer resource for the user, in addition, the PGW may also allocate an IP address for the UE.

Step 602: the UE transmits a first subscription information configuration request to the SMF of the second operator, where the request includes the IMEI of the UE.

Specifically, the two ways as following may be used for triggering step 602:

When a UE initiates operator network switching directly, namely that a user wants to switch from the network of the first operator to the network of the second operator, the user may manually input an identifier of a SMF of the second operator to the UE, to trigger the online subscription data configuration procedure; where, the identifier of the SMF may be the FQDN (fully qualified domain name) of the SMF or the SMF IP address of the second operator (the IP address of the SMF of the second operator may also be obtained through parsing the aforementioned FQDN of the SMF).

Another case is that, a service provider decides to switch a service from the network of the first operator to the network of the second operator, for example, the national grid providing the smart grid service decides to switch the smart meter service from the network of the first operator to the network of the second operator, in this case, the service provider may transmit the identifier of the SMF of the second operator to the UE, via the connection which has been established between the UE and the network of the first operator, and trigger the UE to executive step 602; herein, the identifier of the SMF may be the FQDN of the SMF or the IP address of the SMF.

Optionally, besides the IMEI of the UE, the first subscription information configuration request may further include the equipment capability information of the UE, a service identifier, a PLMN ID of the network of the second operator and the IMSI allocated to the UE by the network of the first operator and etc. The equipment capability information of the UE may include a circuit connection and/or a data connection supported by the UE, and an encryption security algorithm supported by the UE, and an universal authorization and authentication vector and etc.

Step 603: after receiving the first subscription information configuration request, the SMF searches out an AF corresponding to the UE based on the IMEI in the first subscription information configuration request, and transmits an authorization and authentication request to the AF, where the authorization and authentication request includes the IMEI of the UE.

Besides the IMEI of the UE, the authorization and authentication request may also include: a service identifier and a PLMN ID of the network of the second operator.

Step 604: the AF performs authorization and authentication on the UE according to the IMEI of the UE in the received authorization and authentication request, when the UE passes the authorization and authentication, the AF acquires, according to the IMEI of the UE, the equipment capability information of the UE and the information of the service supported by the UE corresponding to the IMEI of the UE, from the correspondence among the IMEI and the equipment capability information of the UE and the information of service supported by the UE stored in the AF, and transmits an authorization and authentication response message to the SMF, where the authorization and authentication response message includes the equipment capability information of the UE and the information of the service supported by the UE.

Step 605: the SMF receives the authorization and authentication response message transmitted by the AF, acquires the equipment capability information of the UE and the information of the service supported by the UE, and generates user subscription data according to the equipment capability information of the UE and the information of the service supported by the UE, generates user service subscription data according to the information of the service supported by the UE; allocates an IMSI of the network of the second operator to the UE, moreover, the user subscription data and the user service subscription data may include the IMSI allocated to the UE by the SMF;

The SMF transmits the aforementioned user subscription data to the HSS, to enable the HSS to store the user subscription data;

Herein, the SMF may select the HSS based on static configuration, or the SMF may select the HSS based on the IMSI of the network of the second operator reallocated to the UE, or, the SMF may select the HSS based on the user's current location information, no particular limitation is made to this in the present patent.

Specifically, the user subscription data may be transmitted through a user equipment subscription data insertion request, specifically, the user subscription data may include: the IMSI of the UE in the network of the second operator, the network access mode, the authorization and authentication vector, the default bearer QoS parameter, the accounting-related parameter and regional roaming restriction and etc.

Step 606: the SMF transmits the user service subscription data to the SPR, to enable the SPR to store the user service subscription data;

Specifically, the SMF may select the SPR based on the static configuration or the IMSI of the UE in the network of the second operator, and may transmit the user service subscription data through the user equipment subscription data insertion request.

Where, the user service subscription data may include: the IMSI of the UE in the network of the second operator, the UE bearer QoS parameter, the accounting policy and user level and etc.

Step 607: the SMF generates first subscription data needed by the UE according to the equipment capability information of the UE, and transmits the first subscription data to the UE, to enable the UE to store the first subscription data;

Specifically, the first subscription data may be transmitted through a first subscription data insertion request.

Where, the first subscription data may include: the IMSI of the UE in the network of the second operator, the authorization and authentication vector, the prohibited PLMN ID and etc.

Further, the steps 605, 606 and 607 may be one step, namely, performs the operations in steps 605, 606 and 607 simultaneously, or, the order of the steps 606 and 607 may be changed.

Step 608: the UE connects to the network of the second operator, where the specific procedure is similar to the prior art, and will not be repeated herein.

According to the method provided in this embodiment, switching from the network of the first operator to the network of the second operator as triggered by the UE or the service provider can be realized, thereby satisfying requirements of the user and the service provider for changing the operator network.

Figure 7:
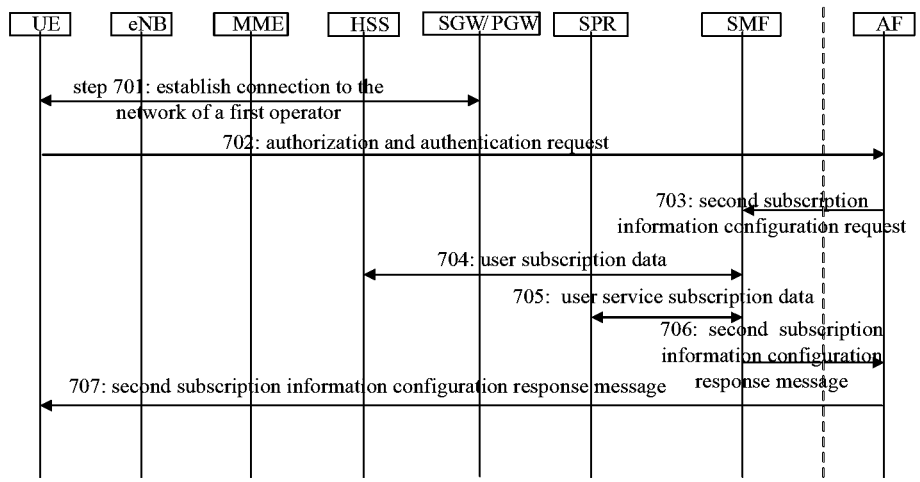
FIG. 7 is a schematic signaling flowchart of online subscription data configuration described from a perspective of interactions among multiple network elements according to still another embodiment of the present invention.

FIG. 7 is a schematic signaling flowchart of online subscription data configuration described from a perspective of interactions among multiple network elements according to still another embodiment of the present invention; please refer to FIG. 7, the method provided in the this embodiment is applicable to the case that a UE has already connected to a network of a first operator, and then the UE initiates switching a service from the network of the first operator to a network of a second operator. The method in this embodiment may include:

Step 701: a UE establishes connection to the network of the first operator by utilizing subscription data of the first operator.

Step 702: the UE establishes a connection to an AF of a second operator, then, transmits an authorization and authentication request to the AF, where the authorization and authentication request may include the IMEI of the UE.

Specifically, before establishing the connection to the AF of the second operator, the mechanism of discovering the AF of the second operator may be based on usual means in the prior art such as an IP (internet protocol) address or a FQDN of the AF of the second operator, no particular limitation is made to this in the present patent.

Step 703: after receiving the authorization and authentication request transmitted by the UE, the AF performs authorization and authentication on the UE according to the IMEI of the UE; the AF assigns a SMF of the second operator for the UE passing the authentication and acquires the equipment capability information of the UE and the information of the service supported by the UE according to the IMEI of the UE; the AF transmits a second subscription information configuration request to the SMF of the second operator, where the second subscription information configuration request includes: the equipment capability information of the UE, the information of the service supported by the UE and the IMEI.

Optionally, in the step 702, the authorization and authentication request transmitted to the AF by the UE may further include a PLMN ID of the network of the second operator in addition to the IMEI of the UE, correspondingly, in this step, the AF may search out the SMF of the second operator according to the PLMN ID of the network of the second operator.

Step 704: the SMF receives the second subscription information configuration request transmitted by the AF, allocates an IMSI in the network of the second operator to the UE, and acquires the equipment capability information of the UE and the information of the service supported by the UE from the second subscription information configuration request, generates user subscription data according to the equipment capability information of the UE and the information of the service supported by the UE, generates user service subscription data according to the information of the service supported by the UE; where, the user subscription data and the user service subscription data may include the IMSI allocated to the UE by the SMF;

The SMF transmits the user subscription data to the HSS, to enable the HSS to store the user subscription data.

Step 705: the SMF transmits the user service subscription data to the SPR, to enable the SPR to store the user service subscription data.

Step 706: the SMF generates first subscription data needed by the UE according to the equipment capability information of the UE, and transmits the first subscription data to the AF through a second subscription information configuration response message.

Step 707: the AF receives the second subscription information configuration response message transmitted by the SMF, and forwards it to the UE.

Optionally, the steps 706 and 707 in this embodiment may also be implemented in one step, namely in the step 706, after generating the first subscription data needed by the UE, the SMF may search out the UE based on the IP of the UE, and establishes connection with the UE, then transmits the first subscription data to the UE directly through the second subscription information configuration response message; of course, in this way, in step 703, the second subscription information configuration request transmitted from the AF to the SMF may further include the IP of the UE.

According to the method provided in this embodiment, switching from the network of the first operator to the network of the second operator as triggered by a UE can be realized, thereby satisfying requirements of the user for changing the operator network, and the interaction process is much simpler.

Figure 8:
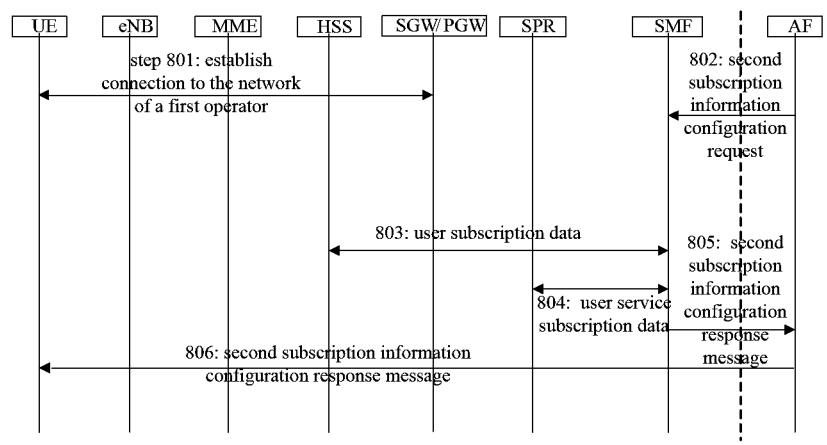
FIG. 8 is a schematic signaling flowchart of online subscription data configuration described from a perspective of interactions among multiple network elements according to still another embodiment of the present invention.

FIG. 8 is a schematic signaling flowchart of online subscription data configuration described from a perspective of interactions among multiple network elements according to still another embodiment of the present invention; please refer to FIG. 8, the method provided in the this embodiment is applicable to the case that a UE has already connected to a network of a first operator, and then a service provider initiates switching from the network of the first operator to a network of a second operator, and is particularly applicable to a large scale online subscription data configuration procedure when the service provider decides to simultaneously perform switching for multiple UEs belonging to the service provider. The difference between this embodiment and embodiment 7 is that, this embodiment is the switching procedure initiated by the service provider. The method of this embodiment may include:

Step 801: a UE establishes connection to the network of the first operator by utilizing subscription data of the first operator; optionally, there may be multiple UEs.

Step 802: an AF selects a SMF of a second operator, and transmits a second subscription information configuration request to the SMF, where the second subscription information configuration request includes: equipment capability information of the UE, information of a service supported by the UE and IMEI;

Optionally, when there are multiple UEs, the second subscription information configuration request may further include the correspondence among the IMEI of the UE, the equipment capability information of the UE and the information of the service supported by the UE.

Optionally, in addition to the equipment capability information of the UE, the information of the service supported by the UE and the IMEI, the second subscription information configuration request may further include: IMSI of the UE under the network of the first operator, IP of the UE and etc.;

when there are multiple UEs, the second subscription information configuration request may further include a correspondence among the IMSI of the UE under the network of the first operator, the IP of the UE and the UE.

Step 803: the SMF receives the second subscription information configuration request transmitted by the AF, allocates IMSIs under the network of the second operator to the UEs respectively, and acquires the equipment capability information for the UE and the information of the service supported by the UE from the second subscription information configuration request, generates user subscription data of the UE according to the equipment capability information of the UE and the information of the service supported by the UE, generates user service subscription data of the UE according to the information of the service supported by the UE; where, the user subscription data and the user service subscription data may include the IMSI allocated to the UE by the SMF;

The SMF transmits the user subscription data to the HSS, to enable the HSS to the user subscription data; optionally, when there are multiple UEs, the SMF further generates the correspondence among the UE, the user subscription data and the user service subscription data, and transmits the correspondence between the UE and the user subscription data to the HSS.

Optionally, after storing the user subscription data, the HSS may transmits a storing user subscription data success indication message to the SMF.

Step 804: the SMF transmits the user service subscription data to the SPR, to enable the SPR to store the user service subscription data.

Optionally, when there are multiple UEs, the SMF may further transmit the correspondence between the UE and the user service subscription data to the SPR.

Optionally, after storing the user service subscription data successfully, the SPR may transmit a storing user service subscription data success indication message to the SMF.

Step 805: the SMF generates first subscription data needed by the UE according to the equipment capability information of the UE, and transmits a second subscription information configuration response message to the AF, where the second subscription information configuration response message includes the first subscription data; when there are multiple UEs, the SMF further generates correspondence between the UE and the first subscription data needed by the UE simultaneously; and transmits the subscription information configuration response message corresponding to each UE to the AFs respectively.

Step 806: the AF receives the subscription information configuration response message transmitted by the SMF, and forwards the subscription information configuration response message to the UE.

Optionally, after receiving the subscription information configuration response message, the UE may store the first subscription data, and transmits a storing first subscription data success indication message to the AF, and the AF may further forwards the storing first subscription data success indication message to the SMF.

Later, the UE connects to the network of the second operator in accordance with the prior art.

According to the method provided in this embodiment, all or a part of UEs executing service of a service provider may switch from a network of a first operator to a network of a second operator under control of the service provider according to the needs of a service provider, thereby improving the flexibility of the service provider in selecting an operator, and thus satisfying the practical operating requirements of the service provider better.

Figure 9:
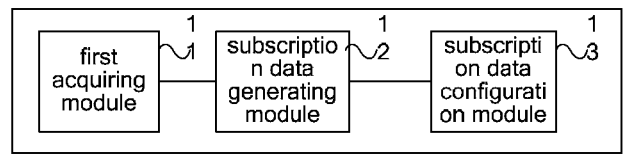
FIG. 9 is a schematic structure diagram of a subscription data configuration function device (SMF) according to an embodiment of the present invention.

FIG. 9 is a schematic diagram of a subscription data configuration function device (SMF) according to an embodiment of the present invention, as shown in FIG. 9, each module and unit of the SMF may separately or corporately execute the process procedure executed by the SMF in the method embodiments corresponding to figures FIG. 1 to FIG. 3, FIG. 4A and FIG. 4B, and FIG. 5 to FIG. 8. The SMF provided in this embodiment includes:

a first acquiring module 11, configured to acquire equipment capability information of a user equipment (UE) and information of a service supported by the UE;

a subscription data generating module 12, configured to generate user subscription data according to the equipment capability information of the UE and the information of the service supported by the UE, and generating user service subscription data according to the information of the service supported by the UE; where the user subscription data and the user service subscription data include an international mobile subscriber identity (IMSI) allocated to the UE by the SMF; and a subscription data configuration module 13, configured to perform subscription data configuration on a home subscriber server (HSS) and a subscription profile repository (SPR), according to the user subscription data and the user service subscription data. The first subscription data configuration on a home subscriber server HSS and a subscription profile repository SPR, according to the user subscription data and the user service subscription data module 11 may be a transceiver, a subscription data generating module 12 may be a processor, and the subscription data configuration module 13 may be a transceiver.

Figure 10:
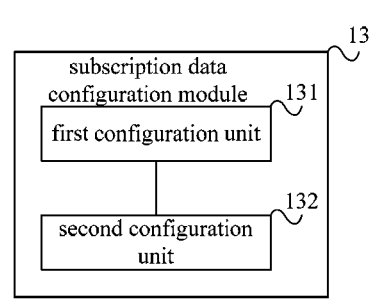
FIG. 10 is a schematic structure diagram of an embodiment of the subscription data configuring module in FIG. 9.

FIG. 10 is a schematic structure diagram of an embodiment of the subscription data configuring module in FIG. 9, as shown in FIG. 10, in the SMF, the subscription data configuration module 13 may specifically include:

a first configuration unit 131, configured to transmit the user subscription data to the HSS, to enable the HSS to store the user subscription data; and a second configuration unit 132, configured to transmit the user service subscription data to the SPR, to enable the SPR to store the user service subscription data.

The unit 131 or the unit 132 may be implemented by a transmitter.

Figure 11:
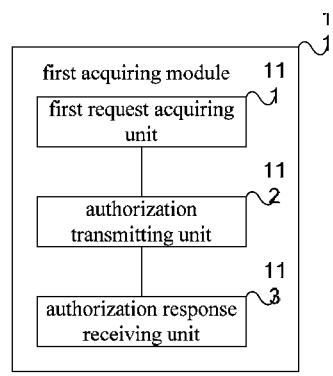
FIG. 11 is a schematic structure diagram of an embodiment of the first obtaining module in FIG. 9.

FIG. 11 is a schematic structure diagram of an embodiment of the first obtaining module in FIG. 9, as shown in FIG. 11, in the SMF, the first acquiring module 11 may include:

a first request acquiring unit 111, configured to acquire a first subscription information configuration request, where the first subscription information configuration request includes the international mobile equipment identity (IMEI) of the UE;

an authorization transmitting unit 112, configured to transmit an authorization and authentication request to an application server (AF), where the authorization and authentication request includes the IMEI of the UE; and an authorization response receiving unit 113, configured to receive an authorization and authentication response message returned by the AF, where the authorization and authentication response message includes the equipment capability information of the UE and the information of the service supported by the UE.

The authorization transmitting unit 112 may be implemented by a transmitter, and the authorization response receiving unit 113 may be a receiver.

Figure 12:
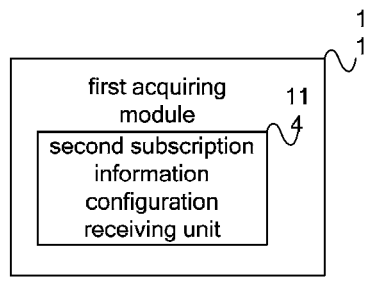
FIG. 12 is a schematic structure diagram of another embodiment of the first obtaining module in FIG. 9.

FIG. 12 is a schematic structure diagram of another embodiment of the first obtaining module in FIG. 9, as shown in FIG. 12, in the SMF, the first acquiring module 11 may include:

a second subscription information configuration receiving unit 114, configured to receive a second subscription information configuration request transmitted by an application server (AF), where the second subscription information configuration request includes: the equipment capability information of the UE, the information of service supported by the UE and the international mobile equipment identity (IMEI) of the UE The second configuration subscription information receiving unit 114 may be a receiver.

Figure 13:
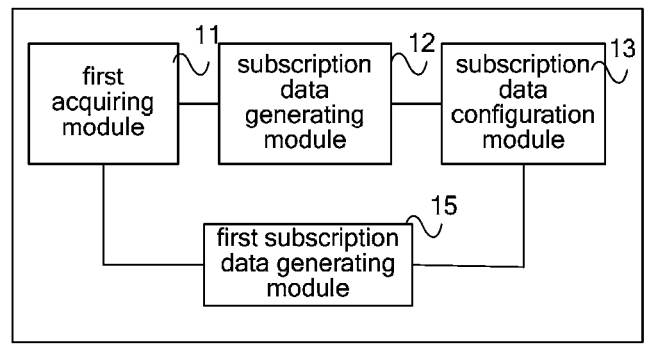
FIG. 13 is a schematic structure diagram of a subscription data configuration function device (SMF) according to another embodiment of the present invention.

FIG. 13 is a schematic structure diagram of a subscription data configuration function device (SMF) according to another embodiment of the present invention, as shown in FIG. 13, each module and unit of the SMF may separately or corporately execute the process procedure executed by the SMF in the method embodiments corresponding to figures FIG. 1 to FIG. 3, FIG. 4A and FIG. 4B, and FIG. 5 to FIG. 8. Based on the SMF as shown in FIG. 9, the SMF in this embodiment, further includes:

a first subscription data generating module 15, configured to generate first subscription data needed by the UE according to the equipment capability information of the UE, and transmitting the first subscription data to the UE, to enable the UE to store the first subscription data.

The SMF provided in the above embodiments may be used for executing the technical solutions executed by a SMF in the aforementioned method embodiments, where the implementing principle and the technical effect are similar, and will not be repeated here.

According to the SMF provided in this embodiment, performing online subscription data configuration on the UE and the network side can be realized, when the UE is configured with no subscription data of any operator, or the UE is already configured with subscription data of a first operator but needs to be reconfigured with subscription data of a second operator thereby satisfying the requirements of a user or an application provider utilizing an eUICC for changing an operator.

Figure 14:
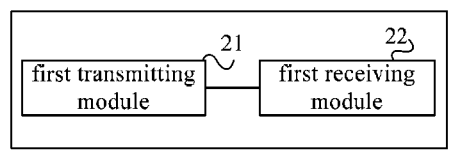
FIG. 14 is a schematic structure diagram of a home subscriber server (HSS) according to an embodiment of the present invention.

FIG. 14 is a schematic structure diagram of a home subscriber server (HSS) according to an embodiment of the present invention, as shown in FIG. 14, each module and unit of the HSS may separately or corporately execute the process procedure executed by the HSS in the method embodiments corresponding to figures FIG. 1 to FIG. 3, FIG. 4A and FIG. 4B, and FIG. 5 to FIG. 8. The HSS in this embodiment may include:

a first transmitting module 21, configured to transmit a first subscription information configuration request to a subscription data configuration function device SMF, where the first subscription information configuration request includes an international mobile equipment identity (IMEI) of a user equipment (UE); and a first receiving module 22, configured to receive and store user subscription data transmitted by the SMF, where the user subscription data is generated according to equipment capability information of the UE and information of a service supported by the UE and is transmitted by the SMF, and the user subscription data includes the international mobile subscriber identity (IMSI) allocated to the UE by the SMF.

The first transmitting module 21 may be a transmitter, and the first receiving module 22 may be a receiver.

Figure 15:
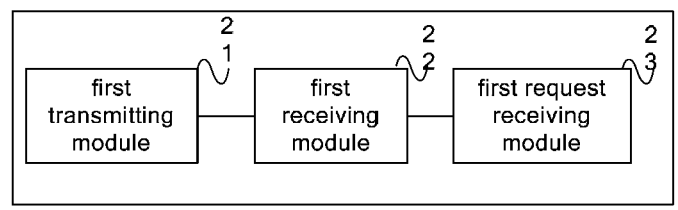
FIG. 15 is a schematic structure diagram of a home subscriber server (HSS) according to an embodiment of the present invention.

FIG. 15 is a schematic structure diagram of a home subscriber server (HSS) according to an embodiment of the present invention, as shown in FIG. 15, each module and unit of the HSS may separately or corporately execute the process procedure executed by the HSS in the method embodiments corresponding to figures FIG. 1 to FIG. 3, FIG. 4A and FIG. 4B, and FIG. 5 to FIG. 8. Based on the HSS as shown in FIG. 14, the HSS in this embodiment, further includes:

a first request receiving module 23, configured to receive the first subscription information configuration request which is forwarded via a mobility management entity (MME) from the UE.

The first request receiving module 23 may be a receiver.

Figure 16:
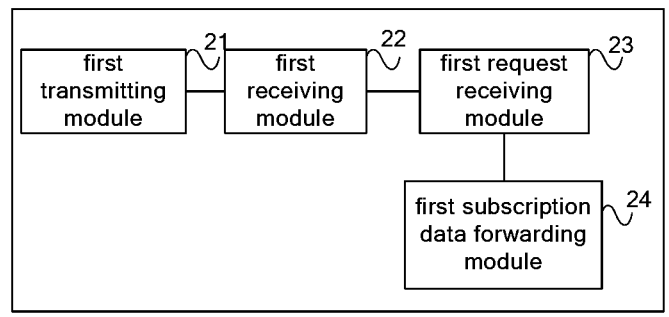
FIG. 16 is a schematic structure diagram of a home subscriber server (HSS) according to an embodiment of the present invention.

FIG. 16 is a schematic structure diagram of a home subscriber server (HSS) according to an embodiment of the present invention, as shown in FIG. 16, each module and unit of the HSS may separately or corporately execute the process procedure executed by the HSS in the method embodiments corresponding to figures FIG. 1 to FIG. 3, FIG. 4A and FIG. 4B, and FIG. 5 to FIG. 8. Based on the HSS as shown in FIG. 15, this embodiment further includes:

a first subscription data forwarding module 24, configured to receive a first subscription data needed by the UE, where the first subscription data is transmitted by the SMF, and transmitting a first subscription information configuration response message to the UE, to enable the UE to store the first subscription data, where the first subscription information configuration response message includes the first subscription data, and the first subscription data is generated by the SMF according to the equipment capability information of the UE. The first subscription data forwarding module 24 may be a transceiver.

The HSS provided in the above embodiments may be used for executing the technical solutions executed by a HSS in the aforementioned method embodiments, where the implementing principle and the technical effect are similar, and will not be repeated here.

When the HSS provided in this embodiment cooperates with the SMF provided in the embodiments of the present invention, performing online subscription data configuration on the UE and the network side can be realized, thereby satisfying the requirements of a user or an application provider utilizing an eUICC for changing an operator.

Figure 17:
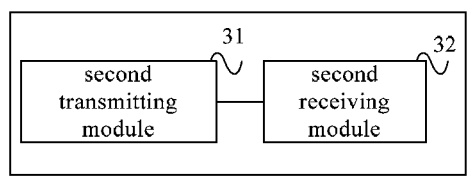
FIG. 17 is a schematic structure diagram of a mobility management entity (MME) according to an embodiment of the present invention.

FIG. 17 is a schematic structure diagram of a mobility management entity (MME) according to an embodiment of the present invention, as shown in FIG. 17, each module and unit of the MME may separately or corporately execute the process procedure executed by the MME in the method embodiments corresponding to figures FIG. 1 to FIG. 3, FIG. 4A and FIG. 4B, and FIG. 5 to FIG. 8. The MME in this embodiment may include:

a second transmitting module 31, configured to transmit a first subscription information configuration request to a subscription data configuration function device (SMF), where the first subscription information configuration request includes an international mobile equipment identity (IMEI) of a user equipment (UE); and a second receiving module 32, configured to receive a first subscription information configuration response message transmitted by the SMF, where the first subscription information configuration response message is transmitted by the SMF after the SMF acquires equipment capability information of the UE and information of a service supported by the UE, generates user subscription data according to the equipment capability information of the UE and the information of the service supported by the UE, generates user service subscription data according to the information of the service supported by the UE, and completes subscription data configuration on a home subscriber server (HSS) and a subscription profile repository (SPR) according to the user subscription data and the user service subscription data.

The second transmitting module 31 may be a transmitter, and the second receiving module 32 may be a receiver.

Figure 18:
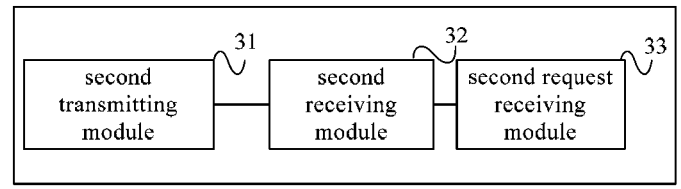
FIG. 18 is a schematic structure diagram of a mobility management entity (MME) according to an embodiment of the present invention.

FIG. 18 is a schematic structure diagram of a mobility management entity (MME) according to an embodiment of the present invention, as shown in FIG. 18, each module and unit of the MME may separately or corporately execute the process procedure executed by the MME in the method embodiments corresponding to figures FIG. 1 to FIG. 3, FIG. 4A and FIG. 4B, and FIG. 5 to FIG. 8. Based on the MME as shown in FIG. 17, the embodiment further includes:

a second request receiving module 33, configured to receive the first subscription information configuration request transmitted by the UE; so that the first subscription information configuration request is transmitted to the SMF via the second transmitting module 31 subsequently. The second request receiving module 33 may be a receiver.

The MME provided in the above embodiments may be used for executing the technical solutions executed by an MME in the aforementioned method embodiments, where the implementing principle and the technical effect are similar, and will not be repeated here.

When the MME provided in this embodiment cooperates with the SMF provided in embodiments of the present invention, performing online subscription data configuration on the UE and the network side can be realized, when the UE is configured with no subscription data of any operator, or the UE is already configured with subscription data of a first operator but needs to be reconfigured with subscription data of a second operator, thereby satisfying the requirements of a user or an application provider utilizing an eUICC for changing an operator.

Figure 19:
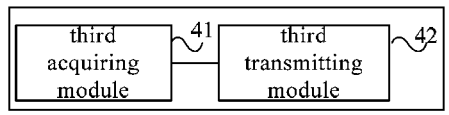
FIG. 19 is a schematic structure diagram of an application server (AF) according to an embodiment of the present invention.

FIG. 19 is a schematic structure diagram of an application server (AF) according to an embodiment of the present invention, as shown in FIG. 19, each module and unit of the AF may separately or corporately execute the process procedure executed by the AF in the method embodiments corresponding to figures FIG. 1 to FIG. 3, FIG. 4A and FIG. 4B, and FIG. 5 to FIG. 8. The AF in this embodiment may include:

a third acquiring module 41, configured to acquire equipment capability information of a user equipment (UE), and information of a service supported by the UE; and a third transmitting module 42, configured to transmit the equipment capability information of the UE and the information of the service supported by the UE to a subscription data configuration function device (SMF), to enable the SMF to generate user subscription data according to the equipment capability information of the UE and the information of the service supported by the UE, and generate user service subscription data according to the information of the service supported by the UE, and perform subscription data configuration on a home subscriber server (HSS) and a subscription profile repository (SPR) according to the user subscription data and the user service subscription data, where the user subscription data and the user service subscription data include an international mobile subscriber identity IMSI allocated to the UE by the SMF. The third transmitting module 42 may be a transmitter.

Figure 20:
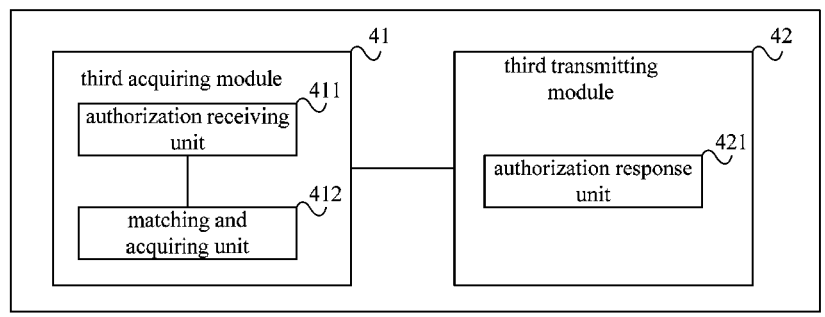
FIG. 20 is a schematic structure diagram of an application server (AF) according to another embodiment of the present invention.

FIG. 20 is a schematic structure diagram of an application server (AF) according to another embodiment of the present invention, as shown in FIG. 20, is embodiment is a more specific implementation of the AF as shown in FIG. 19, in the AF of this embodiment, the third acquiring module 41 may include:

an authorization receiving unit 411, configured to receive an authorization and authentication request transmitted by the SMF, where the authorization and authentication request includes the international mobile equipment identity (IMEI) of the UE; and a matching and acquiring unit 412, configured to acquire the equipment capability information of the UE and the information of the service supported by the UE according to the IMEI of the UE in the authorization and authentication request.

The authorization receiving unit 411 may be a receiver, and the matching and acquiring unit 412 may be a processor.

Further, the third transmitting module 42 may include:

an authorization response unit 421, configured to transmit an authorization and authentication response message to the SMF, where the authorization and authentication response message includes the equipment capability information of the UE and the information of the service supported by the UE. The authorization response unit 421 may be a transmitter.

Figure 21:
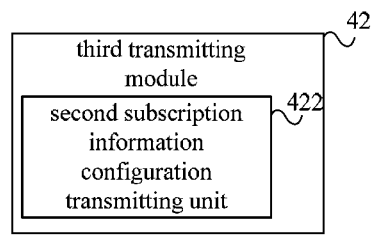
FIG. 21 is a schematic structure diagram of another embodiment of the third transmitting module in FIG. 19.

FIG. 21 is a schematic structure diagram of another embodiment of the third transmitting module in FIG. 19, the third transmitting module 42 may include:

a second subscription information configuration transmitting unit 422, configured to transmit a second subscription information configuration request to the SMF, where the second subscription information configuration request includes: the equipment capability information of the UE, the information of the service supported by the UE, and the IMEI of the UE. The second subscription information configuration transmitting unit 422 may be a transmitter.

Figure 22:
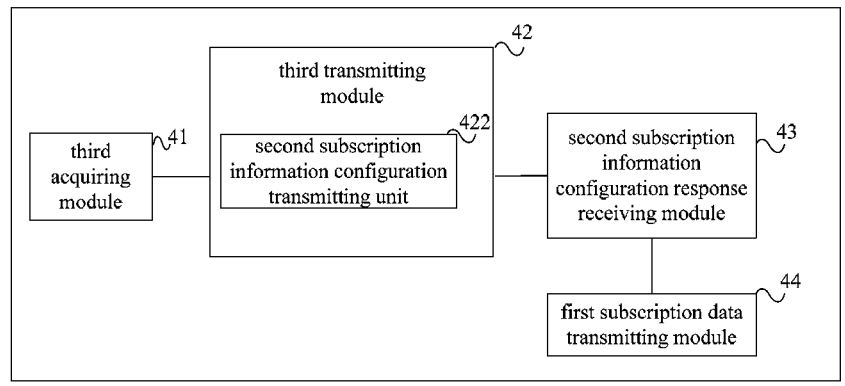
FIG. 22 is a schematic diagram of an application server (AF) according to another embodiment of the present invention.

FIG. 22 is a schematic diagram of an application server (AF) according to another embodiment of the present invention, as shown in FIG. 22, based on the AF shown in FIG. 19, in this embodiment, the AF may further include:

a second subscription information configuration response receiving module 43, configured to receive a second subscription information configuration response message transmitted by the SMF, where the second subscription information configuration response message includes first subscription data needed by the UE; where the first subscription data is generated by the SMF according to the equipment capability information of the UE; and a first subscription data transmitting module 44, configured to transmit the first subscription data to the UE. Where, the third transmitting module 42 may also utilize the specific structure as shown in FIG. 21.

The second subscription information configuration response receiving module 43 may be a receiver, and the first subscription data transmitting module 44 may be a transmitter.

Figure 23:
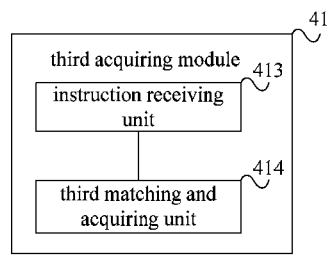
FIG. 23 is a schematic structure diagram of another embodiment of the third acquiring module in FIG. 19.

FIG. 23 is a schematic structure diagram of another embodiment of the third acquiring module in FIG. 19, as shown in FIG. 23, the third acquiring module 41 may include:

an instruction receiving unit 413, configured to receive an operator switching instruction; and a third matching and acquiring unit 414, configured to acquire the equipment capability information of the UE, and the information of the service supported by the UE according to the operator switching instruction.

The instruction receiving unit 413 may be a receiver, and the third matching and acquiring unit 414 may be a processor.

The AF provided in the above embodiments may be used for executing the technical solutions executed by an AF in the aforementioned method embodiments, where the implementing principle and the technical effect are similar, and will not be repeated here.

When the AF provided in this embodiment cooperates with the SMF provided in embodiments of the present invention, performing online subscription data configuration on the UE and the network side can be realized, when the UE is configured with no subscription data of any operator and needs to be connected to a network of a second operator for the first time, or the UE is already connected to a network of a first operator but needs to switch to a network of the second operator, thereby satisfying the requirements of a user or an application provider utilizing an eUICC for changing an operator.

Figure 24:
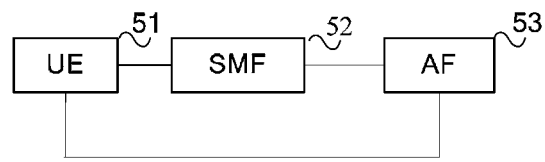
FIG. 24 is a schematic structure diagram of a system for online subscription data configuration according to an embodiment of the present invention.

FIG. 24 is a schematic structure diagram of a system for online subscription data configuration according to an embodiment of the present invention, as shown in FIG. 24, the system for online subscription data configuration in is embodiment may include: a subscription data configuration function device (SMF) 52, an application server (AF) 53, and a user equipment (UE) 51. The apparatuses such as a SMF, an AF and a UE in this embodiment may execute the process procedure executed by the corresponding apparatus in the method embodiments corresponding to the figures FIG. 1 to FIG. 3, FIG. 4A and FIG. 4B, and FIG. 5 to FIG. 8.

Where, the SMF 52 may specifically use the structures as shown in figures from FIG. 9 to FIG. 13, the AF 53 may then use the structures as shown in figures from FIG. 19 to FIG. 23; and the UE 51 may be in the eUICC-embedded form, and the operator network logon instruction or the operator switching instruction may be input into the UE manually; moreover, the system may further include a HSS and an MME, where, the HSS may use the structures as shown in FIG. 14 or FIG. 15 or FIG. 16, and the MME may use the structures as shown in FIG. 17 or FIG. 18, where the implementing principle and the technical effect of the system are similar with that of the aforementioned embodiments, and will not be repeated here.

According to the system for online subscription data configuration provided in this embodiment, performing online subscription data configuration on the UE and the network side can be realized, when the UE is configured with no subscription data of any operator and needs to be connected to a network of a second operator for the first time, or the UE is already configured with subscription data of a first operator but needs to be connected to a network of the second operator, thereby satisfying the requirements of a user or an application provider utilizing an eUICC for changing an operator.

Persons of ordinary skill in the art may understand that all or a part of the steps of the methods according to embodiments of the present invention may be implemented by a program instructing relevant hardware. The program may be stored in a computer readable storage medium. When the program runs, the steps of the methods according to the embodiments are performed. The storage medium may be any medium that is capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present invention.

What is claimed is:

1. A method for online subscription data configuration, comprising:
   acquiring, by a subscription management function (SMF), equipment capability information of a user equipment (UE) and information of a service supported by the UE;
   generating, by the SMF, user subscription data according to the equipment capability information of the UE and the information of the service supported by the UE, and generating user service subscription data according to the information of the service supported by the UE; wherein the user subscription data and the user service subscription data comprise an international mobile subscriber identity (IMSI) allocated to the UE by the SMF; and
   performing, by the SMF, subscription data configuration on a home subscriber server (HSS) and a subscription profile repository (SPR), according to the user subscription data and the user service subscription data.

2. The method according to claim 1, wherein the performing, by the SMF, subscription data configuration on the HSS and the SPR, according to the user subscription data and the user service subscription data comprises:
   transmitting, by the SMF, the user subscription data to the HSS, to enable the HSS to store the user subscription data; and
   transmitting, by the SMF, the user service subscription data to the SPR, to enable the SPR to store the user service subscription data.

3. The method according to claim 1, wherein the acquiring, by the SMF, the equipment capability information of the UE and the information of the service supported by the UE comprises:
   acquiring, by the SMF, a first subscription information configuration request, wherein the first subscription information configuration request comprises an international mobile equipment identity (IMEI) of the UE;
   transmitting, by the SMF, an authorization and authentication request to an application server (AF), wherein the authorization and authentication request comprises the IMEI of the UE; and
   receiving, by the SMF, an authorization and authentication response message returned by the AF, wherein the authorization and authentication response message comprises the equipment capability information of the UE and the information of the service supported by the UE.

4. The method according to claim 3, wherein the acquiring, by the SMF, the first subscription information configuration request comprises:
   receiving, by the SMF, the first subscription information configuration request transmitted by the UE; or
   receiving, by the SMF, the first subscription information configuration request transmitted by the HSS, wherein the first subscription information configuration request is forwarded by the HSS after being transmitted by the UE to the HSS via a mobility management entity (MME); or
   receiving, by the SMF, the first subscription information configuration request transmitted by an MME, wherein the first subscription information configuration request is forwarded by the MME after being transmitted by the UE to the MME.

5. The method according to claim 1, wherein the acquiring, by the SMF, the equipment capability information of the UE and the information of the service supported by the UE comprises:
   receiving, by the SMF, a second subscription information configuration request transmitted by an application server (AF), wherein the second subscription information configuration request comprises: the equipment capability information of the UE, the information of service supported by the UE, and an international mobile equipment identity (IMEI) of the UE.

6. The method according to claim 1, further comprising:

generating, by the SMF, first subscription data needed by the UE according to the equipment capability information of the UE, and transmitting the first subscription data to the UE, to enable the UE to store the first subscription data.

7. The method according to claim 6, wherein the transmitting, by the SMF, the first subscription data to the UE comprises:

transmitting, by the SMF, a first subscription information configuration response message to the HSS, to enable the HSS to forward the first subscription data to the UE via a mobility management entity (MME), wherein the first subscription information configuration response message comprises the first subscription data; or transmitting, by the SMF, the first subscription information configuration response message to an MME, to enable the MME to transmit the first subscription data to the UE; or transmitting, by the SMF, a second subscription information configuration response message to an application server (AF), so as to transmit the first subscription data to the UE via the AF, wherein the second subscription information configuration response message includes the first subscription data.

* * * * *